United States Patent
Yamazaki et al.

(10) Patent No.: US 11,295,902 B2
(45) Date of Patent: Apr. 5, 2022

(54) SOLID ELECTROLYTIC CAPACITOR INCLUDING ANODE BODY PENETRATING INTO ANODE-SIDE ELECTRODE LAYER

(71) Applicant: Panasonic Intellectual Property Management Co., Ltd., Osaka (JP)

(72) Inventors: Renki Yamazaki, Osaka (JP); Takahiro Kumakawa, Kyoto (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 16/795,960

(22) Filed: Feb. 20, 2020

(65) Prior Publication Data

US 2020/0335284 A1 Oct. 22, 2020

(30) Foreign Application Priority Data

Apr. 22, 2019 (JP) .............................. JP2019-081118

(51) Int. Cl.
| | |
|---|---|
| *H01G 9/07* | (2006.01) |
| *H01G 9/012* | (2006.01) |
| *H01G 9/15* | (2006.01) |
| *H01G 9/025* | (2006.01) |
| *H01G 9/04* | (2006.01) |

(52) U.S. Cl.
CPC ............. *H01G 9/07* (2013.01); *H01G 9/012* (2013.01); *H01G 9/025* (2013.01); *H01G 9/04* (2013.01); *H01G 9/15* (2013.01)

(58) Field of Classification Search
CPC ............ H01G 9/15; H01G 9/025; H01G 9/04; H01G 9/07; H01G 9/012
See application file for complete search history.

(56) References Cited

U.S. PATENT DOCUMENTS

| | | | | |
|---|---|---|---|---|
| 6,259,348 B1 * | 7/2001 | Kuriyama | ............ | H01G 9/0003 337/232 |
| 2002/0001169 A1 * | 1/2002 | Shiraishi | ................ | H01G 9/012 361/523 |

(Continued)

FOREIGN PATENT DOCUMENTS

| | | | | |
|---|---|---|---|---|
| EP | 0024302 A2 * | 3/1981 | ............. | H01G 9/012 |
| EP | 0227527 A1 * | 7/1987 | ............... | H01G 9/08 |

(Continued)

*Primary Examiner* — David M Sinclair
(74) *Attorney, Agent, or Firm* — Wenderoth, Lind & Ponack, L.L.P.

(57) ABSTRACT

A solid electrolytic capacitor includes stacked capacitor elements. Each capacitor element includes: an anode body; a dielectric layer provided on a surface of the anode body and including a plurality of voids; a solid electrolyte layer provided on a surface of the dielectric layer; a cathode body provided on a surface of the solid electrolyte layer; and an insulating layer that includes a portion of the dielectric layer and an insulating resin filling the plurality of voids included in the portion of the dielectric layer, the insulating layer insulating and separating between an anode side and a cathode side, and the insulating layer being provided on the anode side of the dielectric layer. An anode portion adhesive resin is provided between adjacent insulating layers.

10 Claims, 5 Drawing Sheets

(56) References Cited

U.S. PATENT DOCUMENTS

| | | | |
|---|---|---|---|
| 2005/0047060 A1* | 3/2005 | Arai | H01G 9/012 |
| | | | 361/312 |
| 2010/0039751 A1* | 2/2010 | Oohata | H01G 9/042 |
| | | | 361/523 |
| 2010/0165547 A1* | 7/2010 | Kuranuki | H01G 9/15 |
| | | | 361/525 |
| 2011/0157776 A1* | 6/2011 | Ishida | H01G 9/15 |
| | | | 361/524 |
| 2016/0071654 A1 | 3/2016 | Kimura et al. | |
| 2017/0140877 A1* | 5/2017 | Kuromi | H01G 9/10 |
| 2017/0365415 A1* | 12/2017 | Demizu | H01G 9/048 |
| 2017/0365419 A1* | 12/2017 | Demizu | H01G 9/012 |
| 2019/0122827 A1* | 4/2019 | Furukawa | H01G 9/26 |
| 2019/0244765 A1* | 8/2019 | Harada | H01G 9/045 |
| 2020/0211784 A1* | 7/2020 | Tamatani | H01G 9/045 |

FOREIGN PATENT DOCUMENTS

| | | | |
|---|---|---|---|
| JP | 2008066430 A | * | 3/2008 |
| JP | 6233410 | | 11/2017 |

* cited by examiner

SOLID ELECTROLYTIC CAPACITOR INCLUDING ANODE BODY PENETRATING INTO ANODE-SIDE ELECTRODE LAYER

CROSS REFERENCE TO RELATED APPLICATIONS

This application is entitled to and claims the benefit of Japanese Patent Application No. 2019-081118, filed on Apr. 22, 2019, the disclosure of which including the specification, drawings and abstract is incorporated herein by reference in its entirety.

TECHNICAL FIELD

The present disclosure relates to a solid electrolytic capacitor, and a method for producing the same.

BACKGROUND ART

There is a demand for capacitors having an excellent impedance characteristic in a high-frequency region in accordance with development of high frequency electronic devices. To meet this demand, various solid electrolytic capacitors using a conductive polymer having high electrical conductivity as a solid electrolyte are studied (see, for example, Patent Literature (hereinafter, referred to as PTL) 1).

In recent years, downsizing and increasing in capacity are strongly desired for a solid electrolytic capacitor used in the vicinity of a CPU (central processing unit) of a personal computer and the like. In addition, low ESR (equivalent series resistance) corresponding to high frequency, low ESL (equivalent series inductance) excellent in noise removal and transient response, and the like are required. Various studies are performed for satisfying these requirements.

A description will be herein given of a multilayer solid electrolytic capacitor disclosed in PTL 1 with reference to FIG. 3. FIG. 3 is a side-surface cross-sectional view of the multilayer solid electrolytic capacitor disclosed in PTL 1.

In FIG. 3, solid electrolytic capacitor 31 includes multilayer unit 33, exterior 43, anode-side external electrode 47, and cathode-side external electrode 48.

Multilayer unit 33 is formed by staking a plurality of capacitor elements 32. Capacitor elements 32 each include: valve action metal substrate 34 including core 35 and rough surfaces 36 formed along surfaces of core 35; dielectric coating 37 formed on rough surfaces 36; solid electrolyte layer 39 formed on dielectric coating 37; and current collector layer 40 formed on solid electrolyte layer 39. Current collector layers 40 of a plurality of capacitor elements 32 are electrically connected to each other.

Exterior 43 has an electrical insulation property and covers multilayer unit 33 in a state where one end face 38 of valve action metal substrate 34 is exposed on first end face 44.

Anode-side external electrode 47 is provided on or above first end face 44 of exterior 43 and on or above a portion of each of an upper surface and a lower surface adjacent to the end face of exterior 43. Further, anode-side external electrode 47 is electrically connected to core 35 of valve action metal substrate 34.

Cathode-side external electrode 48 is provided on or above second end face 45 opposite to first end face 44 of exterior 43. Further, cathode-side external electrode 48 is electrically connected to current collector layer 40.

Anode-side external electrode 47 includes first conductive layer 49, second conductive layer 50 and third conductive layer 51. First conductive layer 49 is formed so as to be in direct contact with core 35 of valve action metal substrate 34 and electrically connects between cores 35 of valve action metal substrates 34 of adjacent capacitor elements 3. Further, first conductive layer 49 is formed by a dry process, such as sputtering, so as to cover one end faces 38 of valve action metal substrates 34 and the entirety of first end faces 44 of exterior 43 around one end faces 38 while extending to a portion of each of an upper surface and a lower surface adjacent to first end face 44.

In solid electrolytic capacitor 31 having the configuration described above, it is made possible to prevent water from entering rough surface 36 of valve action metal substrates 34 and/or moisture from entering between rough surface 36 and exterior 43. Further, second conductive layer 50 is formed on first conductive layer 49, so that the adhesion strength can be improved.

CITATION LIST

Patent Literature

PTL 1
Japanese Patent No. 6233410

SUMMARY OF INVENTION

Technical Problem

In solid electrolytic capacitor 31 of PTL 1, core 35 exposed to one end face 38 of valve action metal substrate 34 is formed of a metal foil, such as an Al (aluminum) foil. Further, rough surface 36 is formed by application of an etching process on the surface of the metal foil, and dielectric coating 37 is formed on rough surface 36.

In addition, when first conductive layer 49 is formed on one end face 38 of valve action metal substrate 34 by a dry process, such as sputtering, dielectric coating 37 on rough surface 36 and exterior 43 composed of a resin material are only mechanically attached to each other using an anchor effect rather than metal bonding having a high bonding strength.

Thus, the bonding strength between dielectric coating 37 and exterior 43 is extremely low, and only application of a low pressure at the time of formation of second conductive layer 50 and third conductive layer 51 causes peeling.

Further, there arises a concern that moisture enters from the porous structure of rough surface 36, due to peeling, at the interface formed by the anchor effect between first conductive layer 49 and rough surface 36.

Likewise, entry of moisture into the entirety of capacitor elements 32 possibly occurs due to peeling, at the interface between first conductive layer 49 and exterior 43.

Accordingly, there arises a problem in that a quality problem occurs when capacitor elements 32 are damaged due to expansion between capacitor elements 32 caused by evaporation of the moisture contained in solid-state electrolytic capacitor 31 at a high temperature during mounting of solid-state electrolytic capacitor 31 on a printed circuit board.

An object of an aspect of the present disclosure is to provide a solid electrolytic capacitor with high reliability while maintaining suitable electrical characteristics, and a method for producing the same.

Solution to Problem

A solid electrolytic capacitor according to one aspect of the present disclosure is a capacitor in which a stacked plurality of capacitor elements are covered by an exterior body, in which the stacked plurality of capacitor elements each include: an anode body; a dielectric layer provided on a surface of the anode body and including a plurality of voids; a solid electrolyte layer provided on a surface of the dielectric layer; a cathode body provided on a surface of the solid electrolyte layer; and an insulating layer that includes an insulating resin insulating and separating between an anode side and a cathode side, the insulating layer being provided on the anode side of the dielectric layer, in which the plurality of voids included in the insulating layer are filled with the insulating resin, and an anode portion adhesive resin is provided between a plurality of the insulating layers adjacent to each other.

A method for producing a solid electrolytic capacitor, according to one aspect of the present disclosure includes: element forming of forming a plurality of capacitor elements each including: an anode body; a dielectric layer provided on a surface of the anode body and including a plurality of voids; a solid electrolyte layer provided on a surface of the dielectric layer; a cathode body provided on a surface of the solid electrolyte layer; and an insulating layer that includes an insulating resin insulating and separating between an anode side and a cathode side, the insulating layer being provided on the anode side of the dielectric layer; stacking the plurality of capacitor elements via a conducive material and an anode portion adhesive resin; sealing for forming an exterior body that covers the plurality of capacitor elements; exposing for forming an anode-end face in which an anode terminal portion being an end portion of the anode body, an end portion of the insulating layer, and an end portion of an anode portion adhesive resin are exposed from the exterior body; contact layer forming for forming a contact layer on the anode terminal portion; first electrode forming for forming an anode-side electrode layer that covers the anode end face including the contact layer, and forming a cathode-side electrode layer electrically connected to the cathode body; second electrode forming for forming an anode-side external electrode that covers the anode-side electrode layer, and forming a cathode-side external electrode that covers the cathode-side electrode layer, in which in the element forming, the plurality of voids included in the insulating layer are filled with the insulating resin, and in the stacking, the anode portion adhesive resin is provided between a plurality of the insulating layers adjacent to each other.

Advantageous Effects of Invention

According to the present disclosure, it is made possible to achieve high reliability while maintaining suitable electrical properties in solid electrolytic capacitors.

DESCRIPTION OF EMBODIMENTS

Hereinafter, an embodiment of the present disclosure will be described with reference to the drawings. Note that, the same symbol is given to each component common in drawings, and the description for the component is omitted suitably.

<Overall Configuration of Solid Electrolytic Capacitor 100>

Figure 1A:
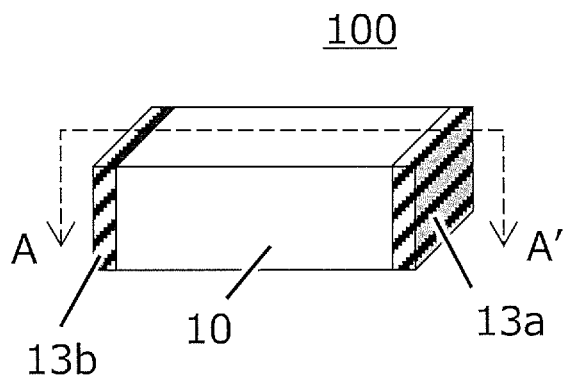
FIG. 1A is a perspective view illustrating a solid electrolytic capacitor according to an embodiment of the disclosure.
Figure 1B:
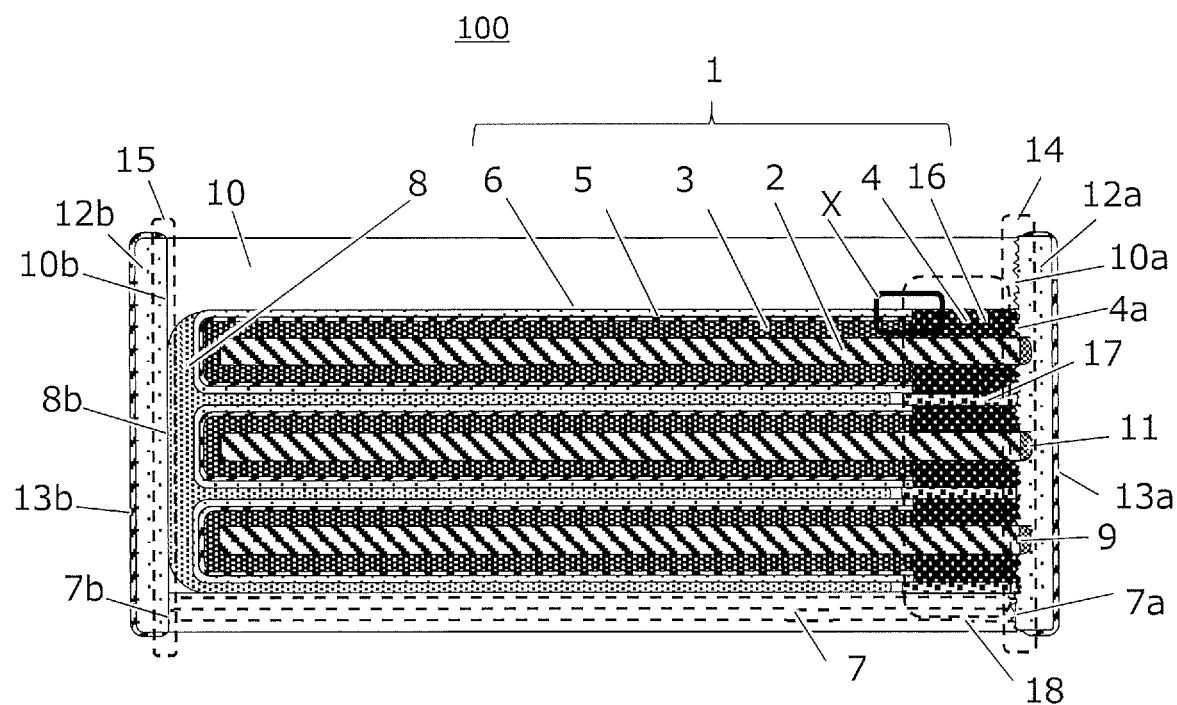
FIG. 1B is a cross-sectional view taken along line A-A' of FIG. 1A.
Figure 1C:
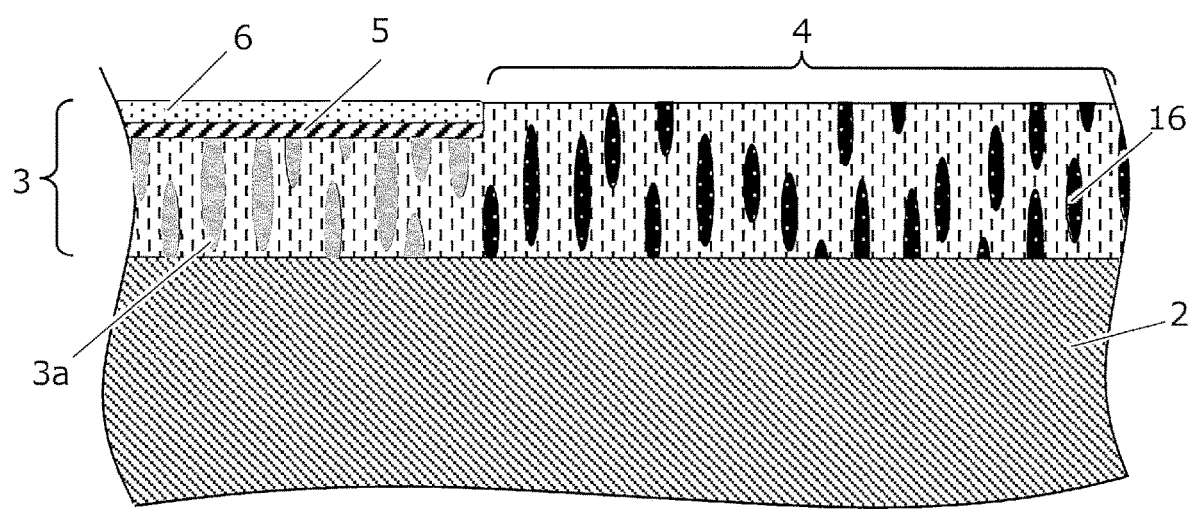
FIG. 1C is an enlarged view of range X of FIG. 1B.

A configuration of solid electrolytic capacitor 100 according to an embodiment of the present disclosure will be described with reference to FIGS. 1A, 1B and 1C. FIG. 1A is a perspective view illustrating solid electrolytic capacitor 100 according to the present embodiment. FIG. 1B is a cross-sectional view taken along line A-A' of FIG. 1A. FIG. 1C is an enlarged view of part X of FIG. 1B.

As illustrated in FIGS. 1A to 1C, solid electrolytic capacitor 100 includes capacitor element 1, support member 7, conductive material 8, anode terminal portion 9, exterior body 10, contact layer 11, anode-side electrode layer 12a, cathode-side electrode layer 12b, anode-side external electrode 13a, cathode-side external electrode 13b, and anode portion adhesive resin 17.

Contact layer 11 is formed on a surface of anode terminal portion 9.

Anode-side electrode layer 12a is formed while covering at least contact layer 11.

Anode-side external electrode 13a and cathode-side external electrode 13b are formed on the surfaces of anode-side electrode layer 12a and cathode-side electrode layer 12b, respectively.

<Capacitor Element 1>

As illustrated in FIG. 1, capacitor element 1 includes anode body 2, dielectric layer 3, insulating layer 4, solid electrolyte layer 5, and cathode body 6.

Dielectric layer 3 is obtained by forming a porous layer by a method, such as chemical etching, on both sides of an Al foil, which is anode body 2, and forming a dielectric coating on the porous layer, for example.

Anode body 2 is an Al foil core member remaining without being made porous. Anode body 2 is enclosed by dielectric layer 3. That is, dielectric layer 3 is disposed on both sides (upper and lower surfaces) of anode body 2.

The thickness of anode body 2 and the thickness of dielectric layer 3 are each 20 to 80 μm. Note that, the materials of anode body 2 and dielectric layer 3 are not limited to an Al foil, but may be, for example, Ta (tantalum) or the like commonly used as a capacitor material.

Insulating layer 4 is formed on anode-side insulating resin filling portion 18 of anode body 2. Insulating layer 4 electrically insulates between anode end face 14 and cathode body 6. In other words, the anode side and the cathode side (illustration is omitted) are electrically insulated (isolated) from each other.

As illustrated in FIG. 1C, dielectric layer 3 is a porous structure in which a large number of voids 3a each being in size of several nm to several tens of μm (provided that the upper limit is 30 μm) are spread. This porous structure is formed by a method, such as chemical etching, for example.

A portion of dielectric layer 3, which is equivalent to insulating layer 4, is impregnated with insulating resin 16 having insulation properties. Accordingly, as illustrated in FIG. 1C, voids 3a in insulating layer 4 are filled with insulating resin 16. In order for voids 3a to be filled with insulating resin 16, insulating resin 16 is preferably a low viscosity resin.

Examples of methods for filling insulating resin 16 into voids 3a include placing dielectric layer 3 under a reduced-pressure environment, and applying an external pressure. Although it depends on the material (e.g., viscosity or the like) of insulating resin 16, in a case where the method of applying an external pressure application is used, the filling rate (may be referred to as the impregnation rate) may be improved depending on the pressurization conditions. For example, in insulating layer 4, voids are filled with insulating resin 16 in descending order of sizes of the voids. In this case, when the filling ratio increases to about 50% or greater, voids of several tens of μm are filled with the insulating resin 16 while voids of several nm are not filled with insulating resin 16. Meanwhile, the particle size of moisture is said to be several tens of μm, so that entry of moisture from outside can be prevented when the filling rate is 50% or greater.

Further, insulating resin 16 has heat resistance properties because thermosetting is performed in a stacking process to be described, hereinafter. Heating temperatures during thermosetting vary from 150° C. to 220° C. although it depends on the curing temperature of the conductive resin in the stacking process. Therefore, the glass transition temperature Tg in insulating resin 16 is preferably at least 150° C. or greater.

In addition, insulating resin 16 preferably has the ability to absorb the impact energy (to be described in detail, hereinafter, in a contact layer forming step) that occurs when a portion of dielectric layer 3 (a portion corresponding to insulating layer 4) is impregnated with insulating resin 16 to form contact layer 11. In other words, insulating resin 16 preferably has properties to absorb the impact energy to a certain extent, to remain viscous even when deforming and to be impact-resistant. For example, insulating resin 16 is preferably a resin having an elastic modulus of 3 GPa to 7 GPa in terms of resin properties.

Insulating resin 16 filled into voids 3a is cured by heat of a high temperature furnace, for example. Note that, in a case where insulating resin 16 is an ultraviolet (UV) curable resin, insulating resin 16 filled into voids 3a may be cured by irradiating insulating resin 16 with ultraviolet light.

The method for forming insulating layer 4 includes, for example, impregnating a portion of porous dielectric layer 3 with insulating resin 16 and then covering the resultant with an insulating resin, such as polyimide. Further, in order to increase the denseness, dielectric layer 3 may be first subjected to compressive stress to be a dense layer, and then a method of impregnating a portion of porous dielectric layer 3 with insulating resin 16 in order for the resultant to have the insulating properties may be used.

As illustrated in FIG. 1B, anode portion adhesive resin 17 is stacked between the anode elements of anode terminal portion 9. As a result, a gap between the anode elements of anode terminal portion 9 is filled.

Further, thermosetting is performed in the stacking process to be described, hereinafter, so that anode portion adhesive resin 17 is provided with heat resistance properties. Heating temperatures during thermosetting vary from 150° C. to 220° C., depending on the curing temperature of the conductive resin in the stacking process. Therefore, glass transition temperature Tg in anode portion adhesive resin 17 is preferably at least 150° C. or greater.

Moreover, anode portion adhesive resin 17 preferably has the ability to absorb the impact energy (to be described in detail, hereinafter, in the contact layer forming step) that is generated when contact layer 11 is formed. In other words, anode portion adhesive resin 17 preferably has properties to absorb the impact energy to a certain extent, to remain viscous even when deforming and to be impact-resistant. For example, anode portion adhesive resin 17 is preferably a resin having an elastic modulus of 3 GPa to 7 GPa in terms of resin properties.

Although FIG. 1B illustrates the case where capacitor element 1 is a single structure, capacitor element 1 may be a composite structure in which heterogeneous materials are combined. For example, capacitor element 1 may be a laminated structure of a dense Al oxide film and a polyimide resin.

Solid electrolyte layer 5 is formed on dielectric oxide layer 3 that is insulated and separated by insulating layer 4 to be on the cathode side. Solid electrolyte layer 5 is composed of, for example, a conductive polymer material such as polypyrrole or polythiophene. In general, solid electrolyte layer 5 is formed by a method such as chemical polymerization or electrolytic polymerization.

Cathode body 6 is formed on solid electrolyte layer 5. Cathode body 6 is formed by sequentially laminating a carbon layer and an Ag (silver) paste layer by, for example, a printing method or a transfer method.

Cathode body 6 is not limited to the laminated structure of the carbon layer and Ag paste layer. For example, cathode body 6 may include conductive paste using a filler other than Ag, or a sintering material in place of the Ag paste. An example of the conductive paste is Cu (copper) paste.

<Support Member 7, Conductive Material 8, and Exterior 10>

A plurality of capacitor elements 1 are stacked one on top of another, in each of which a cathode portion and an anode portion are stacked on support member 7 composed of a glass epoxy substrate, for example, via conductive material 8, and via anode portion adhesive resin 17, respectively. Capacitor element 1 is sealed with exterior body 10 in such a manner that anode terminal portion 9 where the end portion of anode body 2 is exposed is configured. FIG. 1 illustrates three stacked capacitor elements 1 as an example, but the number of stacked capacitor elements 1 is not limited to three.

As described above, for the anode portions, since they are stacked via anode portion adhesive resin 17, a gap between the anode portion elements is filled. Therefore, it is effective to prevent moisture from entering from disconnection or generation of a gap of elements caused by the pressure and/or the like during formation of anode-side external electrode 13a and cathode-side external electrode 13b.

As support member 7, other than a glass epoxy substrate, a substrate having excellent heat-resisting properties, such as a BT (Bismaleimide-Triazine) resin substrate, a polyimide resin substrate, or a Cu-made lead frame may be used, for example. Obviously, the anode side and the cathode side need to be separated so that they can be insulated in a case where a conductive material, such as a lead frame, is used.

For example, conductive paste such as Ag paste is used for conductive material 8. Conductive material 8 is electrically connected to the cathode body of capacitor element 1.

Note that, in FIG. 1B, a case where only conductive material 8 is disposed between adjacent capacitor elements 1 is illustrated, but other than conductive material 8, a metal foil, such as Al, Cu, In (indium), may be interposed, for example, <Anode Terminal Portion 9 and Contact Layer 11>

Contact layer 11 composed of a metal having a smaller ionization tendency than anode body 2 is formed on anode terminal portion 9. This contact layer 11 is not formed on exterior body 10 or insulating layer 4 (both of which are resin-based materials), but is selectively formed only on the surface of anode terminal portion 9 composed of a metal material.

When anode body 2 is Al, it is preferable to use a metal having a smaller ionization tendency than Al as the material of contact layer 11. Examples of such metals include Zn (zinc), Ni (nickel), Sn (tin), Cu, and Ag. Such a metal can suppress the forming of a strong oxide film on the surface of contact layer 11, and ensure a firm electrical connection between contact layer 11 and electrode layer 12a.

Further, when anode body 2 is Al, use of Cu, Zn, or Ag having a close interatomic distance results in formation of an alloy layer due to intermetallic bonding to Al. Thus, the bonding strength between anode bodies 2 can be further improved. Note that, contact layer 11 may be formed of an alloy, such as bronze or brass, other than the formation of a single element metal, or may be formed of laminating Ni and Ag and/or Cu and Ag, for example.

<Structure of Electrode>

Anode end face 14 is composed of contact layer 11, anode-side end face 4a of insulating layer 4, anode-side end face 10a of exterior body 10, and anode-side end face 7a of supporting member 7.

Cathode end face 15 is composed of cathode terminal portion 8b that is a cathode-side end face of conductive material 8, cathode-side end face 10b of exterior body 10 and cathode-side end face 7b of supporting member 7.

Anode end face 14 is covered by anode-side electrode layer 12a. Cathode end face 15 is also covered by cathode-side electrode layer 12b. Electrical conduction between anode terminal portions 9 of stacked capacitor elements 1 is made mainly via anode-side electrode layer 12a.

Further, anode-side electrode layer 12a is covered by anode-side external electrode 13a. Cathode-side electrode layer 12b is also covered by cathode-side external electrode 13b.

The materials of anode-side electrode layer 12a and cathode-side electrode layer 12b are preferably a conductive paste material (a conductive resin material) in which a metal filler (metal particle), such as Ag or Cu, is mixed into a resin material serving as a binder, for example. Accordingly, a binder component suitable for adhesion to materials that constitute, for example, insulating layer 4, exterior body 10 and supporting member 7 can be added to the resin, and bonding by chemical bonding or hydrogen bonding can be expected.

For each of anode-side end face 4a of insulating layer 4, anode-side end face 10a and cathode-side end face 10b of exterior body 10, and anode-side end face 7a and cathode-side end face 7b of supporting member 7, the surface roughness Ra is preferably 5 micrometers or more. This increases the area of contact between each end face and anode-side electrode layer 12a or cathode-side electrode layer 12b and further provides a bonding force due to the anchor effect.

[Method for Producing Solid Electrolytic Capacitor 100]

Next, a method of producing solid electrolytic capacitor 100 according to the present embodiment will be described with reference to FIGS. 2A to 2F. FIGS. 2A to 2F are cross-sectional views of a solid electrolytic capacitor (i.e., solid electrolytic capacitor in the middle of production) in respective steps of the production method.

<Stacking Step>

A stacking step, the first step of the production method, will be described with reference to FIG. 2A.

Figure 2A:
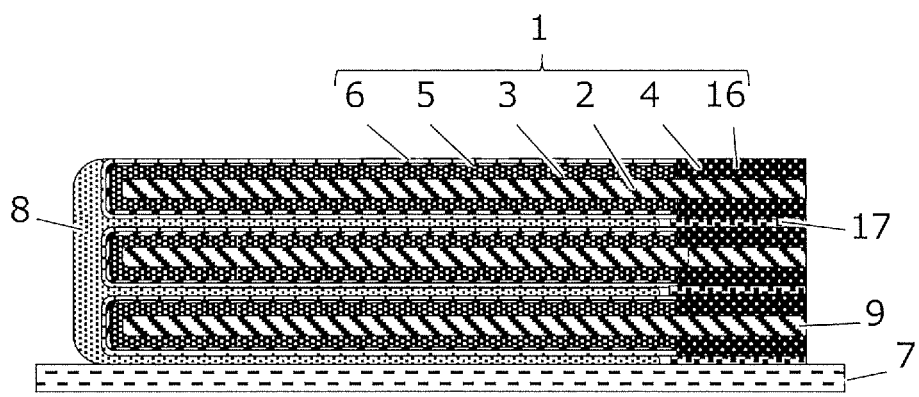
FIG. 2A is a cross-sectional view illustrating the solid electrolytic capacitor during a stacking step according to the embodiment of the disclosure.

Firstly, a plurality of capacitor elements 1 illustrated in FIG. 2A are prepared. In this embodiment, three capacitor elements 1 are stacked as an example.

Next, an appropriate amount of conductive material 8 is applied to the cathode side and an appropriate amount of anode portion adhesive resin 17 is applied to the anode side on support member 7. Then, first capacitor element 1 is accurately mounted on conductive material 8 and anode portion adhesive resin 17 which have been applied to support member 7.

Next, an appropriate amount of conductive material 8 is applied to the cathode side and an appropriate amount of anode portion adhesive resin 17 is applied to the anode side on first capacitor element 1. Then, second capacitor element 1 is accurately mounted on conductive material 8 and anode portion adhesive resin 17 which have been applied to first capacitor element 1.

Next, an appropriate amount of conductive material 8 is applied to the cathode side and an appropriate amount of the anode portion adhesive resin 17 is applied to the anode side on second capacitor element 1. Then, third capacitor element 1 is precisely mounted on conductive material 8 and anode portion adhesive resin 17 which have been applied to second capacitor element 1.

As conductive material 8, thermosetting Ag paste can be used, for example. Examples of methods used for applying conductive material 8 include a dispense method, printing, an ink jet method, a dipping method and a transfer method. Conductive material 8 may be in a form of a sheet capable of adhesion in place of paste.

A thermosetting adhesive resin, for example, may be used as anode portion adhesive resin 17. Examples of methods used for applying anode portion adhesive resin 17 include a dispense method, printing, an ink jet method, a dipping method and a transfer method. Further, anode portion adhesive resin 17 may be in a form of a sheet capable of adhesion in place of paste.

Next, conductive material 8 and anode portion adhesive resin 17 are thermally cured using a high-temperature furnace and/or the like, and cathode bodies 6 of respective capacitor elements 1 are set in electrical conduction with each other. The thermosetting means is not limited to a high temperature furnace, and for example, a hot plate or a reflow furnace may also be used.

The solid electrolytic capacitor is thus in the state illustrated in FIG. 2A by the stacking step described above.

In the above description, three capacitor elements 1 are sequentially stacked on one region of supporting member 7 as an example, but capacitor elements 1 may be stacked simultaneously on multiple regions (for example, in a form of a matrix having multiple columns and multiple rows) of supporting member 7.

<Sealing Step>

A sealing step subsequent to the stacking step will be described with reference to FIG. 2B.

Figure 2B:
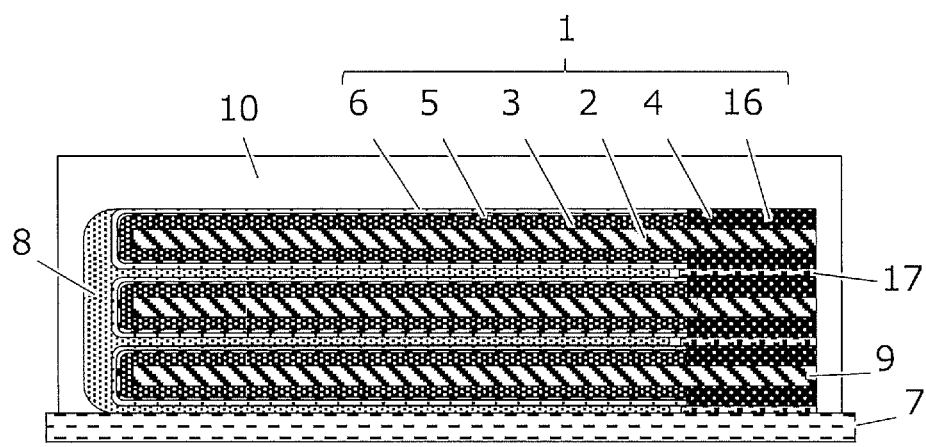
FIG. 2B is a cross-sectional view illustrating the solid electrolytic capacitor during a sealing step according to the embodiment of the disclosure.

As illustrated in FIG. 2B, three stacked capacitor elements 1 are sealed with exterior body 10 in such a manner that capacitor elements 1 are covered.

An epoxy resin containing an inorganic filler such as silica is used as exterior body 10, for example. Exterior body 10 also fills the gap between stacked capacitor elements 1 and the gap between supporting member 7 and capacitor element 1. Examples of methods used for the sealing include transfer sealing, compression sealing, and a method in which a liquid resin is poured into a mold and thermally cured thereafter.

<Exposing Step>

Figure 2C:
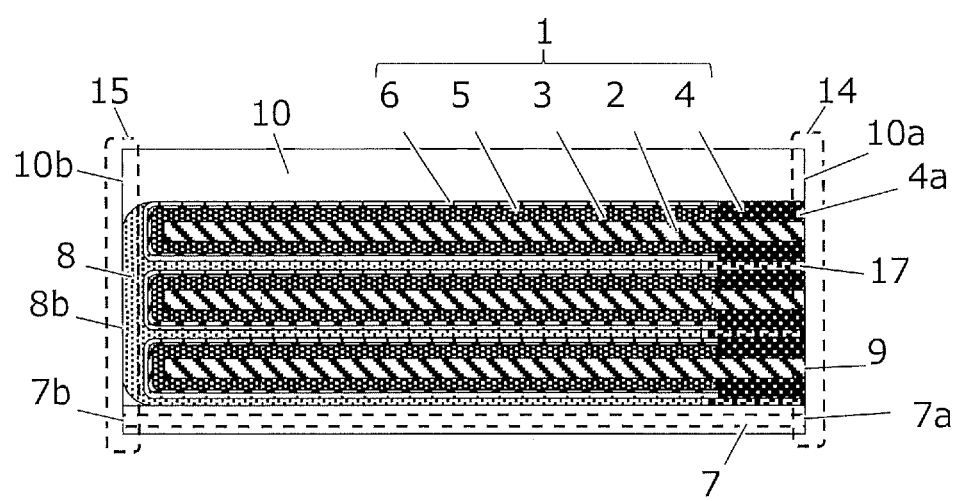
FIG. 2C is a cross-sectional view illustrating the solid electrolytic capacitor during an exposing step according to the embodiment of the disclosure.

An exposing step subsequent to the sealing step will be described with reference to FIG. 2C.

Anode end face 14 and cathode end face 15 are formed for exposing cathode terminal portion 8b and anode terminal portion 9.

An example of the forming method is such that a dicing blade with diamond particles fixed with a bond material is rotated at high speed to perform cutting. When parts of exterior body 10 and supporting member 7 (both end portions in the drawing) illustrated in FIG. 2B are cut by the above method, anode end face 14 and cathode end face 15 are formed as illustrated in FIG. 2C.

Anode end face 14 at this time is mainly composed of anode terminal portion 9, anode-side end face 4a of insulating layer 4, anode-side end face 10a of exterior body 10, and anode-side end face 7a of support member 7. In addition, the porous layer of anode-side end face 4a is impregnated with insulating resin 16.

Cathode end face 15 is mainly composed of cathode terminal portion 8b (that is a cathode-side end face of conductive material 8), cathode-side end face 10b of exterior body 10 and cathode-side end face 7b of supporting member 7 at this point.

<Contact Layer Forming Step>

A contact layer forming step subsequent to the exposing step will be described with reference to FIG. 2D.

Figure 2D:
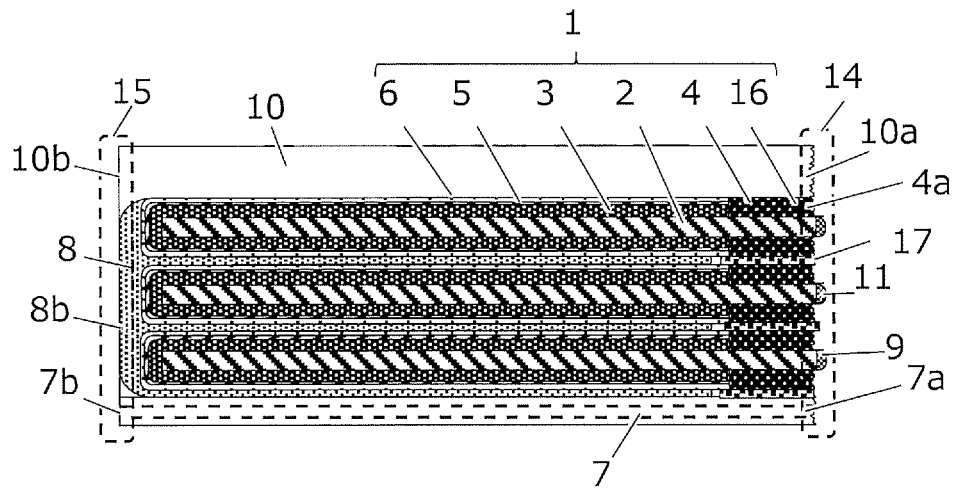
FIG. 2D is a cross-sectional view illustrating the solid electrolytic capacitor during a contact layer forming step according to the embodiment of the disclosure.

As illustrated in FIG. 2D, each of end faces (anode-side end face 4a of insulating layer 4, anode-side end face 10a of exterior body 10 and anode-side end face 7a of supporting member 7) constituting anode end face 14 is roughened. In addition, as illustrated in FIG. 2D, contact layer 11 is formed on the surface of each anode terminal portion 9.

Contact layer 11 is formed, for example, by causing Cu particles to collide with anode terminal portion 9 at a high speed. Cu has a smaller ionization tendency than Al that is a material of anode terminal portion 9, and has an interatomic distance relatively similar to that of Al.

This technique for forming contact layer 11 is called a cold spray method. The cold spray method is a technique for forming a metal film by accelerating metal particles in the order of several μm to several tens of μm from subsonic to supersonic, using a compressed gas, such as air, nitrogen or helium, and causing the particles to collide with the substrate in a solid phase.

Although the adhesion mechanism of metal particles in the cold spray method does not become entirely clear, in general, it is considered that metal particles or a metal base material are plastically deformed by the collision energy of the metal particles, thereby exposing a new surface on a metal surface to perform activation.

With the use of the cold spray method, Cu particles colliding with anode terminal portion 9 at high speed break through the oxide film on the Al surface of anode terminal portion 9, thereby forming a metallic bond between Al and Cu. Accordingly, an alloy layer of Al and Cu is formed at the interface between contact layer 11 and anode terminal portion 9. On the surface of contact layer 11, meanwhile, a layer of Cu that is a non-valve action metal is formed. Contact layer 11 therefore contains a metal having a smaller ionization tendency than anode terminal portion 9.

Further, in the cold spray method described above, particles of sizes in the order of several μm to several tens of m are generally used. This is because acceleration of the particles from subsonic to supersonic when the particles are smaller than several μm does not secure the energy required for collision with the substrate (collision energy). When the collision energy is not secured, the metal bonding between Al and Cu cannot be formed, resulting in adhesion due to the anchor effect. Thus, the bonding strength is very small.

Contact layer 11 formed with particles of sizes in the order of several μm to several tens of m has a thickness of several μm to several hundreds of μm. For aluminum capacitors, the thickness of contact layer 11 is preferably 5 to 100 μm. Note that, when the thickness of contact layer 11 is less than 5 μm, a decrease in strength occurs. Meanwhile, when the thickness of contact layer 11 is larger than 100 μm, a characteristic value deteriorates because the resistance value increases by the amount of thickness of the electrode.

When the cold spray method is performed, Cu particles also collide with each of the end faces composed of non-metallic materials (anode-side end face 4a of insulating layer 4, anode-side end face 10a of exterior body 10 and anode-side end face 7a of supporting member 7).

When a base material (for example, insulating layer 4, exterior body 10 or supporting member 7) on which metal particles collide is a resin base material, the main bond between the metal particles and the resin base material is considered to be mechanical joining due to plastically deformed metal particles cutting into unevenness in the surface of the resin base material. Therefore, for forming a metal film on a resin base material, the following conditions are required: the resin base material has sufficient hardness to efficiently use the collision energy for plastic deformation of the metal particles, a metal material and processing conditions that are more likely to cause plastic deformation of the metal particles are selected, and the resin base material is not easily destroyed by the collision energy.

With the above conditions in mind, epoxy resin generally used as exterior body 10 may have increased hardness as a whole by increasing the mixing ratio of a filler such as silica, but doing so, the ratio of epoxy resin component that becomes a binder decreases, and thus the epoxy resin becomes brittle.

In other words, there are a part where a metal film is formed due to occurrence of sufficient plastic deformation of the metal particles without breaking the resin base material, and at the same time, a part where the resin base material is subjected to brittle fracture and scraped by the collision energy of the metal particles.

Therefore, in order to stably form a metal film having a prescribed thickness or more over the entire surface, a method that increases the film formation processing time, a method that increases the spray amount of metal particles or the like becomes necessary, and thus the productivity significantly decreases.

In addition, although a metal film can be formed over the entire surface, the thickness of the formed metal film varies greatly between anode terminal portion 9 composed of Al that can easily form a film and the exterior body 10 composed of a material such as a resin base material that can be easily scraped. This affects the accuracy of the external shape of the solid electrolytic capacitor.

When the Young's modulus of metal particles is smaller than that of the member constituting a resin base material, plastic deformation of the metal particles tends to be promoted during the collision thereof. In this case, the metal particles tend to be fixed more easily on the resin base material during the formation of a metal film on the resin base material.

On the other hand, for not completely fixing metal particles to a resin base material, the following basic conditions are required: the resin base material is made elastic so that the collision energy is not converted into the energy for plastic deformation, the strength of the resin base material is lowered so that the base material is broken at or below the impact that causes plastic deformation, and a metal material and processing conditions that are less likely cause plastic deformation are selected within a range in which contact layer 11 can be formed on anode terminal portion 9.

That is, by making the Young's modulus of the metal particles (which may be referred to as "contact layer 11") larger than that of the member constituting the resin base material, it is possible to create a state in which fixation is less likely to occur.

For example, when the resin base material is filled with silica having a Young's modulus of 94 GPa, it is preferable to use metal particles (for example, Cu or Ni) which have a higher Young's modulus and are easily joined to Al. However, since the fixation state changes depending on, for example, the shape, size and temperature of the metal particles, and the size and filling rate of silica filling the resin material, the type of metal particles is not limited to the above examples.

In addition, when metal particles are not fixed to the resin base material, the effect of surface roughening can be obtained by causing the metal particles to collide with the resin base material.

FIG. 2D illustrates a case where roughening treatment is not performed on end faces (cathode terminal portion 8b, cathode-side end face 10b, and cathode-side end face 7b) constituting cathode end face 15, but each of end faces constituting cathode end face 15 may be roughened by sandblasting or the like.

Further, although the case where the cold spray method, which is an example of a dry process, has been described as the method of forming contact layer 11, a wet method, such as plating may be used. In the case where a wet process, such as plating is used, there arises a problem in that a plating liquid enters between elements during formation of contact layer 11, causing deterioration of characteristics. In this embodiment, the gaps can be filled by impregnating the porous layer of anode-side end face 4a with insulating resin 16. Further, the gaps between the elements can be filled by stacking anode portion adhesive resin 17 between the elements of the anode portions, thereby making it possible to prevent the liquid from entering into the elements.

In the cold spray method, which is a dry process, a large pressure is generated when metal particles are sprayed with a high pressure gas. In this embodiment, however, the porous layer is impregnated with insulating resin 16, which is a low elastic body resin, and anode portion adhesive resin 17 is in close contact with the elements of the anode portions. Therefore, it is made possible to prevent disconnection of the capacitor element or the like.

Further, in this embodiment, since the porous layer is impregnated with insulating resin 16, which is a low elastic body resin, and anode portion adhesive resin 17 is in close contact with the elements of the anode portions, it is made possible to prevent entry of moisture generated in the first electrode forming step (formation of anode-side electrode layer 12a and cathode-side electrode layer 12b) and second electrode forming step (formation of anode-side external electrode 13a and cathode-side external electrode 13b) between the elements.

<First Electrode Forming Step>

A first electrode forming step subsequent to the contact layer forming step will be described with reference to FIG. 2E.

Figure 2E:
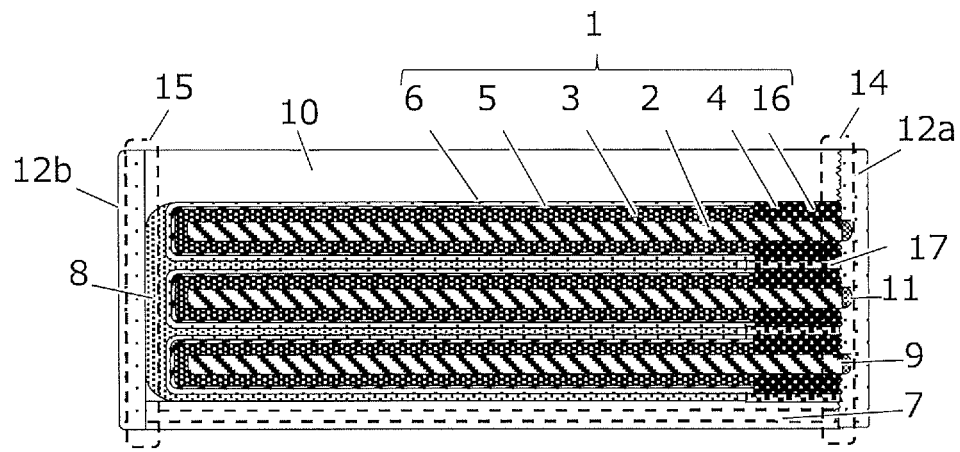
FIG. 2E is a cross-sectional view illustrating the solid electrolytic capacitor during a first electrode forming step according to the embodiment of the disclosure.

As illustrated in FIG. 2E, anode-side electrode layer 12a is formed on anode end face 14 and cathode-side electrode layer 12b is formed on cathode end face 15. Thus, anode body 2 is electrically connected to anode-side electrode layer 12a, and the cathode body is electrically connected to cathode-side electrode layer 12b.

Specifically, Ag paste is applied to each end face by a dipping method, a transfer method, a printing method, a dispense method and/or the like, and then is cured at high temperature to form anode-side electrode layer 12a and cathode-side electrode layer 12b.

As described above, anode-side electrode layer 12a and cathode-side electrode layer 12b are electrically connected to anode body 2 and cathode body 6, respectively, while the thickness of electrodes of electrode layers 12a and 12b directly affects the characteristic value.

For example, when the thickness of anode-side electrode layer 12a is 300 µm or greater, the resistance value of the electrode itself increases, thus causing a decrease in characterization. Conversely, when the thickness of anode-side electrode layer 12a is 20 µm or less, the resistance value of the electrode itself decreases, but the interface strength with contact layer 11 decreases. Thus, the thickness of anode-side electrode layer 12a is preferably, for example, 20 to 300 µm.

Note that, a portion of a surface perpendicular to anode end face 14 (e.g., the upper surface of exterior body 10, the lower surface of support member 7) may be covered by anode-side electrode layer 12a. Likewise, a portion of a surface perpendicular to cathode end face 15 (e.g., the upper surface of exterior body 10, the lower surface of support member 7) is covered by cathode-side electrode layer 12b.

<Second Electrode Forming Step>

A second electrode forming step subsequent to the first electrode forming step will be described with reference to FIG. 2F.

Figure 2F:
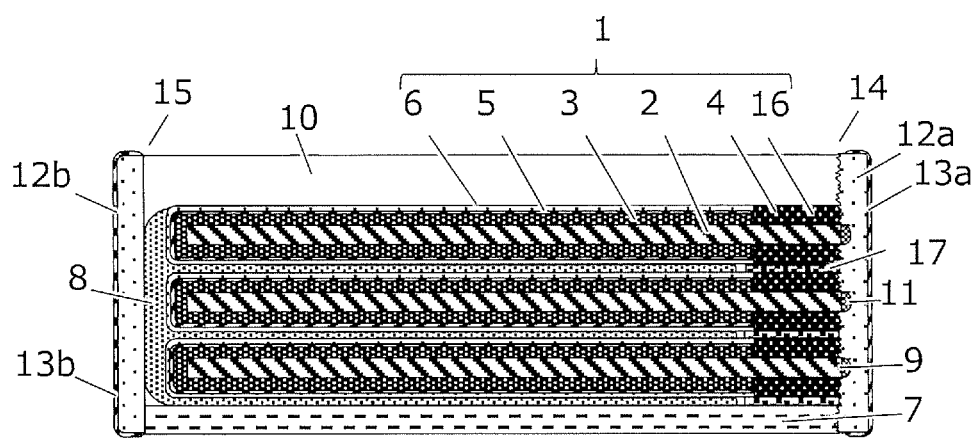
FIG. 2F is a cross-sectional view illustrating the solid electrolytic capacitor during a second electrode forming step according to the embodiment of the disclosure.
Figure 3:
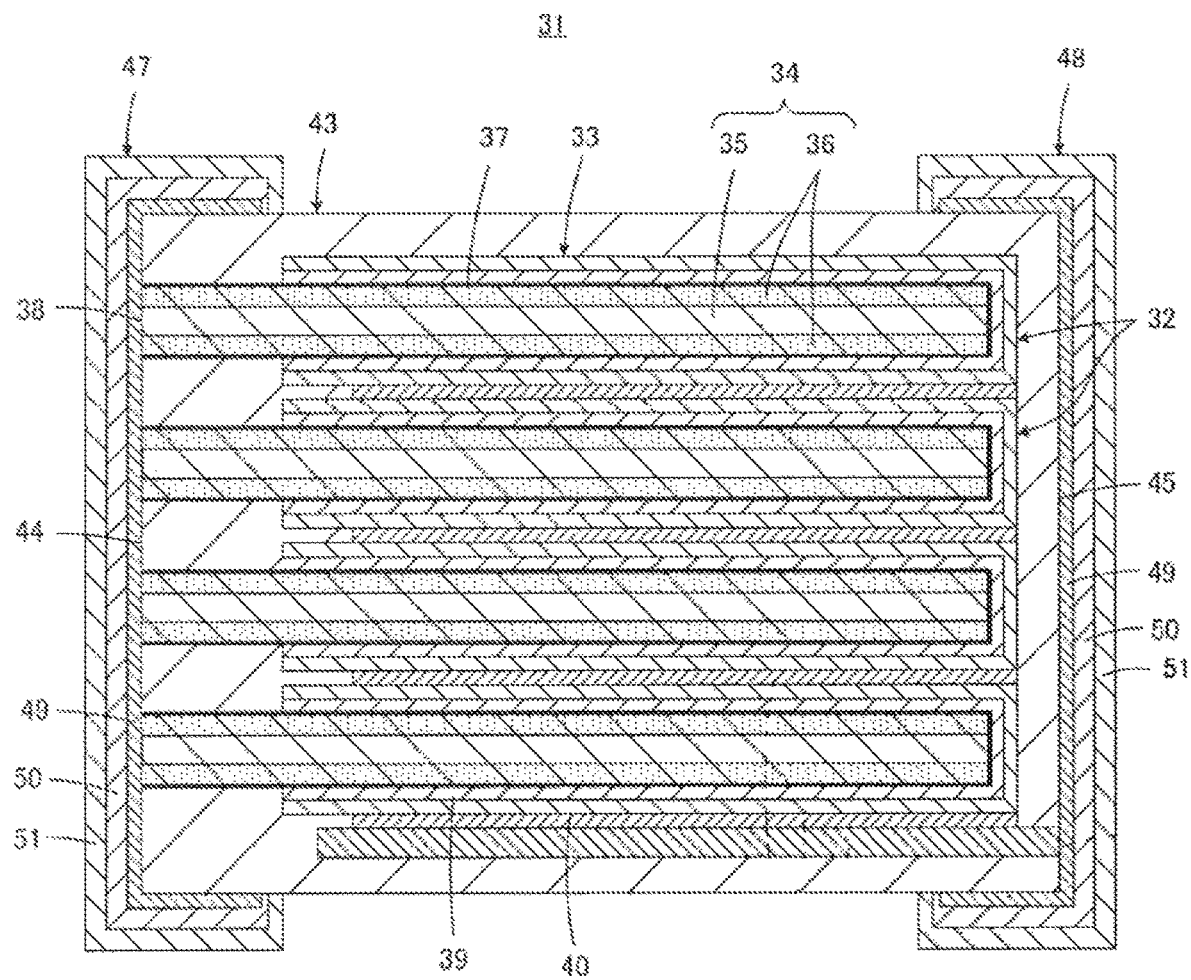
FIG. 3 is a side cross-sectional view illustrating a configuration of a solid electrolytic capacitor according to PTL 1.

As illustrated in FIG. 2F, anode-side external electrode 13a is formed on an outer surface of anode-side electrode layer 12a, and further, cathode-side external electrode 13b is formed on an outer surface of cathode-side electrode layer 12b.

Specifically, anode-side external electrode 13a and cathode-side external electrode 13b are formed by barrel plating, which is one of electroplating methods. Anode-side external electrode 13a and cathode-side external electrode 13b are a laminated structure of Ni and Sn.

Note that, anode-side external electrode 13a and cathode-side external electrode 13b may be formed as a structure including Ag and Sn by the cold spray method described above. Alternatively, anode-side external electrode 13a and cathode-side external electrode 13b may be formed by a combination of barrel plating and dip soldering.

Alternatively, anode-side external electrode 13a and cathode-side external electrode 13b may be formed by adhering a cap of a Cu material previously subjected to an Sn coating to anode-side electrode layer 12a and cathode-side electrode layer 12b, respectively, which are Ag paste (functional as an adhesive).

As has been described thus far, solid electrolytic capacitor 100 illustrated in FIGS. 1A to 1C is produced.

<Effects>

Since solid electrolytic capacitor 100 according to the present embodiment has contact layer 11 metallic-bonded to anode terminal portion 9 composed of a valve action metal foil, solid electrolytic capacitor 100 can secure a low-resistance current path to anode-side external electrode 13a and cathode-side external electrode 13b, thereby maintaining suitable electrical characteristics.

In addition, since anode end face 14 and cathode end face 15 are respectively bonded to anode-side electrode layer 12a and cathode-side electrode layer 12b, which are composed of a conductive resin paste having excellent bonding properties with a resin substrate, tight bonding can be realized. Thus, the reliability of solid electrolytic capacitor 100 can be improved.

Note that, when the portion where contact layer 11 is formed is limited to only anode terminal portion 9, the time required for metal deposition can be greatly reduced. Therefore, the consumption of metal particles can be significantly reduced, and the process time can be shortened, thereby improving the productivity of solid electrolytic capacitor 100.

In addition, the end faces (anode-side end face 4a of insulating layer 4, anode-side end face 10a of exterior body 10, and anode-side end face 7a of support member 7) that constitute anode end face 14 are roughened simultaneously with formation of contact layer 11, so that the adhesion with anode-side electrode layer 12a and cathode-side electrode layer 12b can be improved without increasing the processing time, and extremely high reliability can be obtained.

Further, when the cold spray method, which is a dry process, is used, a large pressure is generated during spraying of metal particles with a high pressure gas. However, since the porous layer is impregnated with insulating resin 16, which is a low elastic body resin, and anode portion adhesive resin 17 is tightly adhered (filled) between the elements of the anode portions, it is made possible to prevent disconnection or the like of the capacitor elements. Furthermore, it is made possible to prevent entry of moisture generated in the first electrode forming step (formation of anode-side electrode layer 12a and cathode-side electrode layer 12b) and/or the second electrode forming step (formation of anode-side external electrode 13a and cathode-side external electrode 13b) between the elements.

According to the description provided above, solid electrolytic capacitor 100 of the present embodiment can realize improvement in reliability and productivity while maintaining suitable electrical characteristics.

The disclosure is not limited to the description of the above embodiment, and various modifications are possible within the scope and spirit thereof.

INDUSTRIAL APPLICABILITY

The solid electrolytic capacitor of the present disclosure is highly reliable and productive while maintaining suitable electrical characteristics. Thus, the solid electrolytic capacitor of the present disclosure is applicable as capacitors in various fields, such as electronic devices (e.g., personal computers, portable terminals or the like), industrial apparatuses, and vehicular devices or the like.

REFERENCE SIGNS LIST

1 Capacitor element
2 Anode body
3 Dielectric layer
4 Insulating layer
4a Anode-side end face of insulating layer 4
5 Solid electrolyte layer
6 Cathode body
7 Supporting member
7a Anode-side end face of supporting member 7
7b Cathode-side end face of supporting member 7
8 Conductive material
8b Cathode terminal portion
9 Anode terminal portion
10 Exterior body
10a Anode-side end face of exterior body 10
10b Cathode-side end face of exterior body 10
11 Contact layer
12a Anode-side electrode layer
12b Cathode-side electrode layer
13a Anode-side external electrode
13b Cathode-side external electrode
14 Anode end face
15 Cathode end face
16 Insulating resin
17 Anode portion adhesive resin
18 Anode-side insulating resin filling portion
100 Solid electrolytic capacitor

The invention claimed is:

1. A solid electrolytic capacitor comprising:
a stacked plurality of capacitor elements covered by an exterior body,
wherein each of the stacked plurality of capacitor elements includes:
an anode body;
a dielectric layer provided on a surface of the anode body and including a plurality of voids;
a solid electrolyte layer provided on a surface of the dielectric layer;
a cathode body provided on a surface of the solid electrolyte layer;
an insulating layer that includes a portion of the dielectric layer and an insulating resin filling the plurality of voids included in the portion of the dielectric layer, the insulating layer insulating and separating between an anode side and a cathode side, and the insulating layer being provided on the anode side of the dielectric layer; and
a contact layer metallic bonded only to an anode terminal portion that is an end portion of the anode body,
wherein:
an anode portion adhesive resin is provided between the insulating layer of a first of the stacked plurality of capacitor elements and the insulating layer of a second of the stacked plurality of capacitor elements which are adjacent to each other;
an anode-side electrode layer is provided adjacent to the insulating layer of each of the stacked plurality of capacitor elements, the dielectric layer of each of the stacked plurality of capacitor elements, and the anode portion adhesive resin; and the anode body of each of the stacked plurality of capacitor elements penetrates into the anode-side electrode layer.

2. The solid electrolytic capacitor according to claim 1, wherein
an end portion of the insulating layer and an end portion of the anode portion adhesive resin are exposed from an anode-side end face of the exterior body; and
the solid electrolytic capacitor further comprises an anode-side external electrode provided on a surface of the anode-side electrode layer.

3. The solid electrolytic capacitor according to claim 2, wherein:
the contact layer contains a metal having a smaller ionization tendency than the anode body of each of the stacked plurality of capacitor elements; and
the contact layer has a thickness of 5 μm to 100 μm.

4. The solid electrolytic capacitor according to claim 1, further comprising:
a cathode-side electrode layer electrically connected to the cathode body of each of the stacked plurality of capacitor elements; and
a cathode-side external electrode provided on a surface of the cathode-side electrode layer.

5. The solid electrolytic capacitor according to claim 1, wherein a filling rate of the insulating resin with respect to the plurality of voids included in the portion of the dielectric layer is equal to 50% or greater.

6. The solid electrolytic capacitor according to claim 1, wherein a glass-transition temperature of the insulating resin is equal to 150° C. or greater.

7. The solid electrolytic capacitor according to claim 1, wherein a glass-transition temperature of the anode portion adhesive resin is equal to 150° C. or greater.

8. The solid electrolytic capacitor according to claim 1, wherein the insulating resin has an elastic modulus of 3 GPa to 7 GPa.

9. The solid electrolytic capacitor according to claim 1, wherein the anode portion adhesive resin has an elastic modulus of 3 GPa to 7 GPa.

10. The solid electrolytic capacitor according to claim 1, wherein:
a material of the anode-side electrode layer is a conductive resin material in which metal particles are mixed into a resin material; and
the anode-side electrode layer has a thickness of 20 μm to 300 μm.

* * * * *